(12) United States Patent
Choi et al.

(10) Patent No.: US 10,541,996 B1
(45) Date of Patent: Jan. 21, 2020

(54) METHODS AND SYSTEMS FOR AUTHENTICATING IDENTITY

(71) Applicant: National Technology & Engineering Solutions of Sandia, LLC, Albuquerque, NM (US)

(72) Inventors: Sung Nam Choi, Sandia Park, NM (US); David John Zage, Fremont, CA (US); Tam Dang Le, Rio Rancho, NM (US); Susan L. Washburn, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 164 days.

(21) Appl. No.: 15/183,454

(22) Filed: Jun. 15, 2016

Related U.S. Application Data

(60) Provisional application No. 62/175,753, filed on Jun. 15, 2015.

(51) Int. Cl.
 *H04L 29/06* (2006.01)
(52) U.S. Cl.
 CPC ........ *H04L 63/0853* (2013.01); *H04L 63/083* (2013.01); *H04L 63/0823* (2013.01)
(58) Field of Classification Search
 CPC ............... H04L 63/083; H04L 63/0838; H04L 63/0853; G06F 21/606
 USPC ......................................................... 713/156
 See application file for complete search history.

(56) References Cited

U.S. PATENT DOCUMENTS

| | | | | |
|---|---|---|---|---|
| 6,044,154 A * | 3/2000 | Kelly | ...................... | G06F 21/31 380/277 |
| 8,572,684 B1 * | 10/2013 | Sama | .................. | H04L 63/0838 726/2 |
| 8,667,265 B1 * | 3/2014 | Hamlet | ................. | H04L 9/0866 326/80 |
| 2003/0204726 A1 * | 10/2003 | Kefford | ................... | G06F 21/42 713/171 |
| 2003/0212894 A1 * | 11/2003 | Buck | ....................... | G06F 21/34 713/184 |
| 2006/0018467 A1 * | 1/2006 | Steinmetz | ............... | G06F 21/34 380/54 |
| 2008/0189772 A1 * | 8/2008 | Sims | ..................... | G06F 21/445 726/5 |
| 2009/0183246 A1 * | 7/2009 | Kokologiannakis | .... | G06F 21/31 726/7 |
| 2010/0180327 A1 * | 7/2010 | Sheets | ................... | H04L 9/3226 726/6 |
| 2010/0229227 A1 * | 9/2010 | Andre | .................. | H04L 9/3213 726/6 |
| 2011/0040640 A1 * | 2/2011 | Erikson | ................. | G06Q 20/10 705/18 |
| 2011/0238573 A1 * | 9/2011 | Varadarajan | ....... | G06Q 20/1085 705/43 |

(Continued)

OTHER PUBLICATIONS

Kim, Alan, et al. "Cyber attack vulnerabilities analysis for unmanned aerial vehicles." Infotech@ Aerospace 2012. 2012. 2438.*

*Primary Examiner* — Syed A Zaidi
(74) *Attorney, Agent, or Firm* — Daniel J. Jenkins

(57) ABSTRACT

Systems and methods are disclosed that provide for secure communications between a user device and an authentication system. The systems and methods create a dynamic identification for the device that is stored in both the device and authentication system.

8 Claims, 6 Drawing Sheets

(56) References Cited

U.S. PATENT DOCUMENTS

2013/0018793 A1* 1/2013 Wong ................ G06Q 20/4097
705/44
2014/0236391 A1* 8/2014 Wood ................... G05D 1/0027
701/2

* cited by examiner

METHODS AND SYSTEMS FOR AUTHENTICATING IDENTITY

CROSS-REFERENCE TO RELATED APPLICATIONS

This application claims priority to U.S. Provisional Patent Application No. 62/175,753, filed on Jun. 15, 2015, entitled "METHODS AND SYSTEMS FOR AUTHENTICATING IDENTITY", the entirety of which is incorporated herein by reference.

STATEMENT OF GOVERNMENT INTEREST

The United States Government has rights in this invention pursuant to Contract No. DE-AC04-94AL85000 between the United States Department of Energy and Sandia Corporation, for the operation of the Sandia National Laboratories.

FIELD

The present disclosure is generally directed to authentication systems and methods, and more particularly to authentication systems and methods that combine a uniquely unclonable device identity verification procedure.

BACKGROUND

Identification is the act of claiming an identity. For conventional authentication, the factors/attributes (attributes) used for authentication are selected from: something you know, something you have, and something you are. An identity is a set of attributes, both physical and perceptual, that uniquely defines a specific entity. Authentication is the act of confirming an identity based on presented attributes.

The authentication of an identity provides a specific level of identity assurance (i.e., the entity is most likely the entity it is claiming to be). In modern society, identification and authentication frequently occur remotely using computing devices by which an entity provides a set of static attributes specific to the identity it is claiming, and a remote server authenticates the claim. For example, an employee for a corporation remotely logs into the corporate network using a login ID and password, and the network confirms that the ID and password have permission to access the network by comparing with the database of the end-user's static ID. However, these identity specific attributes, when digitized, can be easily intercepted and cloned over network communications to allow for unauthorized access.

Existing authentication factors built on static identity information (such as login ID and password) have vulnerabilities that may compromise the security of a communication. With the increase in storage and connected transactions related to sensitive information (e.g., financial data), the consequence of identity misrepresentation can be disastrous. Therefore, the reliance on static identity information creates a challenging security problem.

A variety of software-based security solutions have been proposed for identity authentication protection. The most common is the use of encryption. An encryption key can be used to securely store and transfer sensitive data (e.g., identity attributes). However, the encryption key itself needs to be securely stored or transmitted. Software-based security solutions are also prone to tampering and the encrypted channel is susceptible to crypto-analysis and man-in-the-middle attacks.

Hardware-based security techniques build upon software based techniques and encompass a wide variety of technological innovations: random number generators, encryption key generators, smart cards, biometrics, etc. An existing hardware-based security solution is a Physically Unclonable Function (PUF). PUFs are based on unique, random, and complex characteristics inherent in physical structures consisting of billions of clustered molecules and/or atoms, and are typically derived from the characteristics of the wires and transistors that differ from chip to chip, and are normally associated with the physical characteristics unique to the Integrated Circuit (IC). PUFs can be used to create security applications such as random number generators, encryption key generators, and unique physical IDs, and have been used as a means of authenticating individual ICs or to generate cryptographic keys.

However, there are certain technical challenges and limitations associated with PUF usage: granular environmental control (e.g., temperature, power flow, pressure) and pure energy source generation (e.g., clean laser frequency or high precision electrical power source), exposure of challenge-response pair (CRP) at the manufacturing facility as well as minimization of size, weight and power, and cost to manufacture and deploy. Because of these technical challenges, PUF responses can deviate from the norm, increasing the cost of acquiring consistent and predictable responses. Additionally, the security guarantees provided by PUFs can be difficult to quantify. Additionally, while the positive attributes show some promise for identifying ICs, this technique is not appropriate for non-IC based hardware. In addition, hardware identification based on alpha numeric codes (or any static data) has logical limitations since the uniqueness of the hardware identity is easily compromised when this identity is translated or converted into a digitized form: identity spoofing, replication, and replay attack.

The need remains, therefore, for systems and methods that securely and reliably transmit information.

SUMMARY OF THE DISCLOSURE

The present disclosure is directed to systems and methods that authenticate identity for the secure and reliable transmission of information.

According to embodiments of the present disclosure, systems and methods using Quasi-Physically Unclonable Digital Identification (Quasi-PUDID or Q-PUDID), which will be referred to herein as Physically Unclonable Function (DUF), for identity authentication are disclosed. DUF combines a physical device identity with a dynamic human identity to create a two-factor authentication based on something you know and something you physically have in your possession.

According to an embodiment of the disclosure, a system is disclosed that includes a device comprising device memory, an authenticating system comprising authentication system memory, and a communications network for transmitting data between the device and the authenticating system. The device and system memories contain a device identification assigned to the device, and the authentication system is configured to authenticate the device for each transaction by comparing a dynamic login identification created for each transaction in both the device and the authenticating system.

According to another embodiment of the disclosure, a method is disclosed that includes the following steps: creating a device identification associated with a device by processing a user signature with a generated random number, storing the device identification on the device and on a authentication system, initiating a communication by entering a login into the device, processing the login, the device identification and transaction information on the device to create a dynamic identification, processing the login, device identification and transaction information on the authentication system to create a confirmation dynamic identification, and comparing the dynamic identification and confirmation dynamic identification on the authenticating system to authenticate a user.

DUF technology offers following cybersecurity advantages:
1. Cyber identity is anchored in unique, physically unclonable device. Unlike password or biometrics escrowing, with DUF design, there is no possibility of a mass breach. Criminals must not only steal your password/biometrics but they must also steal your phone or computer where your ephemeral identity must flow through.
2. Because DUF identity is tied to having two factors, what you know and what you have, compromise of one does not compromise the other. DUF solution renders most of the existing cyber threats (ie., identity fraud, APT, remote attacks) irrelevant. Virtual identity is intimately linked to attributes of physical identity.
3. DUF architecture does away with reliance on static information for identity verification. DUF identity is dynamic in that it captures physical integrity of the tamper evident device. DUF architecture does not use encryption to keep static ID confidential, so that identity information is never exposed during authentication transmission.
4. Furthermore, because DUF randomness can be controlled, the assurance level of identities can be mathematically calculated (e.g., by increasing hash size, modifying CRP) and proved prior to deployment. For example, if the password system is designed to accept 4 digit pin numbers vs. 10 digit pin numbers, we know that first case is 1/(10,000−1) possibilities vs 1/(10 Million−1) possibilities. But unlike password, DUF will not increase nuisance factor with increased identity assurance.

An advantage of the present disclosure is to provide systems and methods that use DUF systems and methods to securely communicate Command & Control (C&C) information to devices, such as remote platforms.

Other features and advantages of the present disclosure will be apparent from the following more detailed description of the preferred embodiment, taken in conjunction with the accompanying drawings which illustrate, by way of example, the principles of the disclosure.

DETAILED DESCRIPTION

Figure 1A:
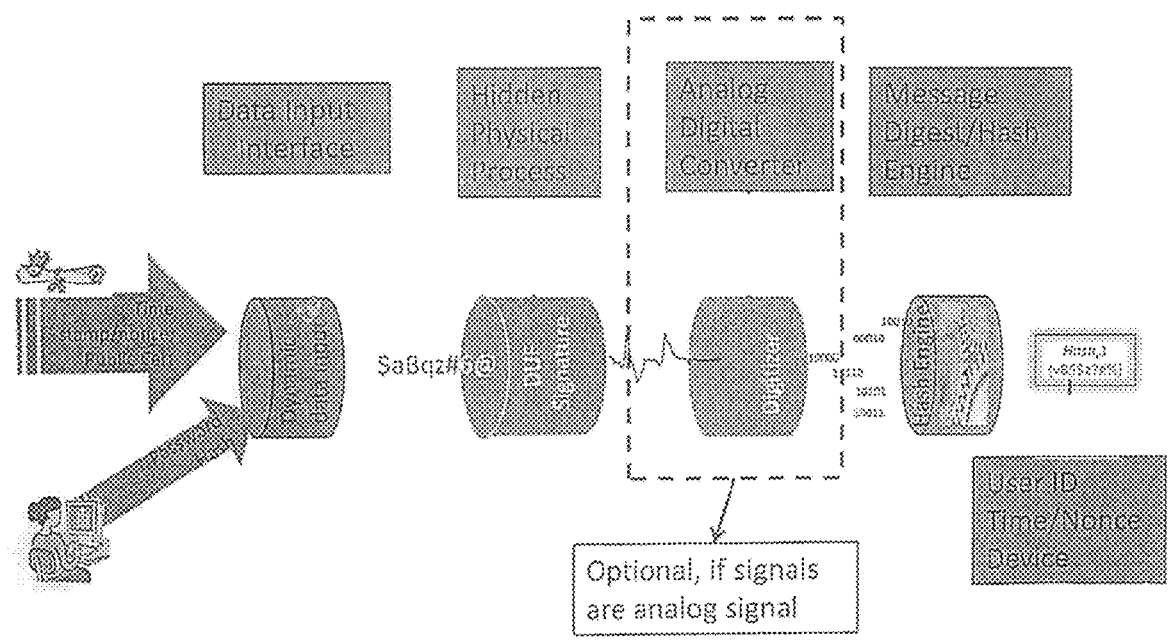
FIG. 1A illustrates a process for DUF device communications according to an embodiment of the disclosure.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

According to embodiments of the present disclosure, systems and methods using a Digitally Unclonable Function (DUF) for identity authentication are disclosed. DUF combines a physical device identity with a dynamic human identity to create a two-factor authentication based on something you know and something you physically have in your possession.

DUF uses simple, inexpensive, macroscopic, and pluggable DUF components to produce reliable and difficult to reproduce results. DUF utilizes a tamper resistant device that modifies input data, using a black-box mechanism, in an unpredictable way. In such a manner, DUF intertwines a dynamic human component with a unique, physically unclonable device (i.e., true two-factor authentication). Both factors must be true in order for each factor to be taken as truth. DUF uses a combination of a series of hash functions to produce high mathematical barriers to cryptanalysis, wherein randomness is controlled by modifying the hash size and dynamic input data, offering assurance level calculations.

According to an embodiment of the disclosure, systems and methods are disclosed that digitally create unclonable hardware identity by creating DUF processing capabilities into a physical medium, such as, but not limited to a Trusted Platform Module (TPM), Smartcard chip, etc.) using Tamper Resistant Mechanisms (TRMs), thereby creating two or more coupled communication endpoints and purposefully executing a series of digital hashes (digital signatures) to securely communicate a one directional DUF challenge response protocol. A hash algorithm used with the DUF ensures the identity and veracity of both the end user and the endpoint communication device.

DUF systems and methods combine tamper resistant capabilities with a series of hash functions. DUF systems and methods utilize a process whereby a dynamic data input is modified in a DUF device to create a device ID that is hidden from external interpretation. DUF systems and methods are able to avoid traditional challenges (i.e., limited range of randomness, inconsistent behavior, trusted foundry issue) while offering high assurance identity verification technique highly resistant to man-in-the-middle attacks and identity spoofing.

DUF systems and methods synchronize the identity at the two communication physical endpoints and execute a series of digital hashes (digital signatures) to securely communicate a one directional DUF identity verification protocol. By separating the two communication end-points (DUF ID generator at sender's device and the authenticating entity at the receiving end), the digital identities (end user and device ID) are not exposed to crypto-analysis in transit. DUF authentication methods are highly resistant to cloning and simulation attacks due to the utilization of hash algorithm instead of encryption/confidentiality algorithm.

DUF authentication leverage the following security techniques:
- Unique features of capturing unclonable dynamic behavior of a human beings or its immediate environmental vicinity
- Separation of the coupled identity via a physically unclonable hardware
- Combination of multiple blinding functions to create an unclonable dynamic ID verification
- Tamper-resistant digital devices where data modifying physical attributes are stored.

DUF provides digitally unclonable hardware identification through the following mechanisms:
- Creating DUF capabilities in a sender or initiator's device
- Separating the coupled identities where the identity resides in an initiator's hardware as well as in authenticating entity
- Executing a series of digital hashes to blind input data in the initiator's device
- Dynamically communicating the signature of hardware and human identity.

According to an embodiment of the disclosure, methods for establishing secure communications between a device and an authenticating system or entity are disclosed. The process includes the following steps.

As a first step, a handshake, verification or registration architecture or protocol is created, downloaded or otherwise established upon a communication architecture or system residing in both a device and an authenticating system. The registration protocol allows for the creation of a device identification (ID) of a device in the authentication system. The device ID is unique because it is created in the system by processing a signature through a unique pathway in the device that can only be replicated by the pathway in the device. The term signature is meant to include, but is not limited to a handwritten signature, symbol, number, or number sequence.

The device ID is created by combining the signature with a random number generated by a random number generator in the device. The term combining is meant to include the digital mixing or overlaying of the signature with the random number. The device ID created and stored in the device memory is communicated to the authenticating system where it is stored. The device ID may be communicated from the device to the authenticating system over wired or wireless secure communications. The secure communications may include protocols, such as, but not limited to secure socket layer (SSL) and transport layer security (TLS). The device may or may not be in communication with the system at the time of creation of the device ID. It is important to note, that for the secure network to remain secure, the device ID residing in both the authenticating system and the device must remain secure or confidential such that no access to the device ID is permitted even by system and/or identity owners.

In an embodiment, the device ID is protected from physical intrusion by using one or more Tamper Resistant Mechanisms (TPMs), such as by storing the device ID in a Tamper Resistant Device such as, but not limited to a SmartChip, Trusted Platform Module, or USB token, which may incorporated into the device or which may reside an another component.

Once the device ID is created in the device, a user may securely communicate with the authenticating system by using a user login (login) and dynamic end-point data for the authenticating system. For example, the login may be, but is not limited to a username, password, personal identification number (pin) number, or any combination thereof. The login is entered into the device and is processed with the device ID and dynamic end-point data (transaction information) to create DUF processed data. The transaction information may be, but is not limited to time, location, merchandise, and/or cost(s), command or request associated with the desired communication. The processing is performed by the device performing a Boolean algebra function of the device ID on the user login and transaction information to create the process data. The algebra function, may be, but is not limited to a XOR function, in which case the process data may be referred to as XOR process data. The process data is put through a message digest function, which is a hash algorithm, to produce a device signature or dynamic ID. The message digest function/hash algorithm provides security by removing a reversible connection between the dynamic ID and the device ID. In an embodiment, communication after device ID registration may be made in the clear (unsecure) as the data is protected by the dynamic ID that cannot be reused or replayed.

Figure 1B:
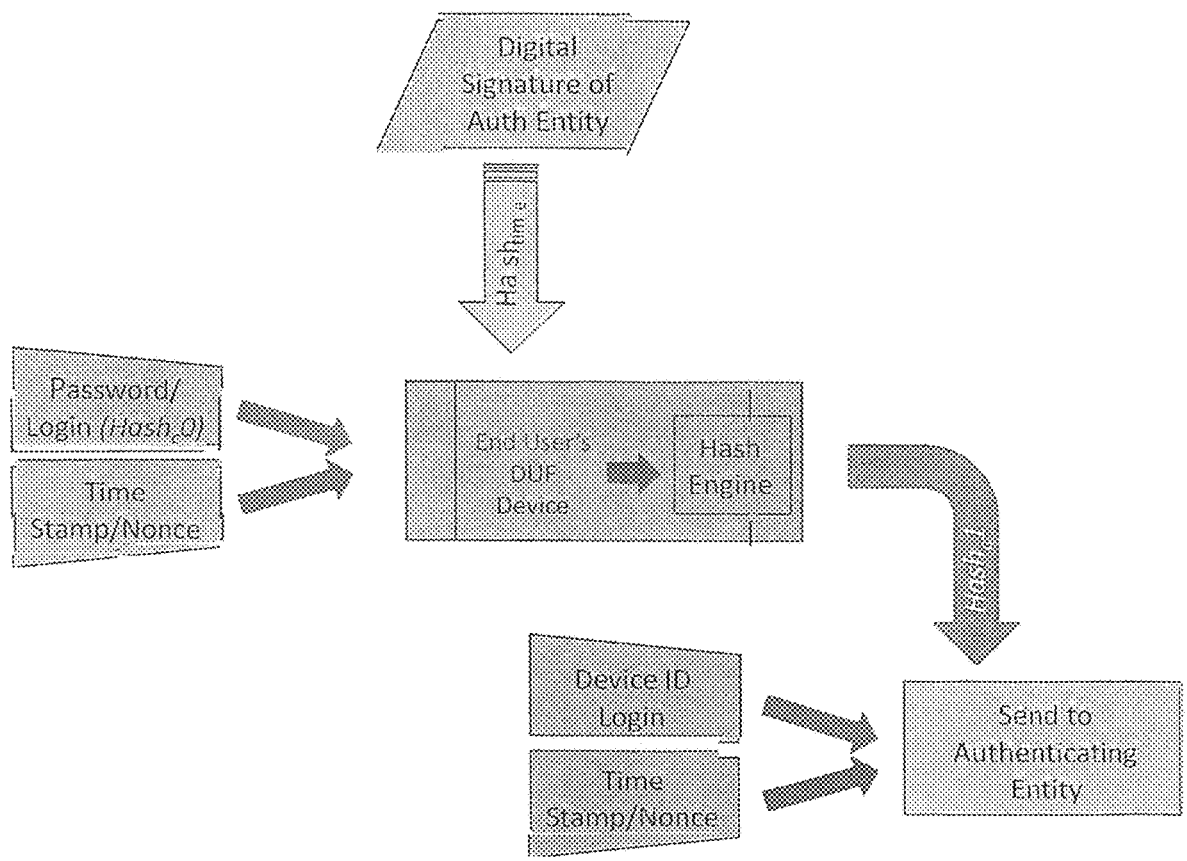
FIG. 1B illustrates a process for DUF device communications according to another embodiment of the disclosure

In addition to the authenticating system receiving the device ID and login, the authenticating system must receive the transaction information, so as to generate the dynamic ID from the transaction information, logon and device ID residing in the authentication system. The transaction information is communicated to the authenticating entity either through clear or secure text. If the dynamic ID generated by the system corresponds to the dynamic ID received from the device, then secure communications are established. FIG. 1 illustrates a process for a device securely communicating with a system as described above and according to an embodiment of the disclosure. The process at any step may include analogue to digital conversion when the input data (login and transactional data) is an analogue signal.

Figure 2:
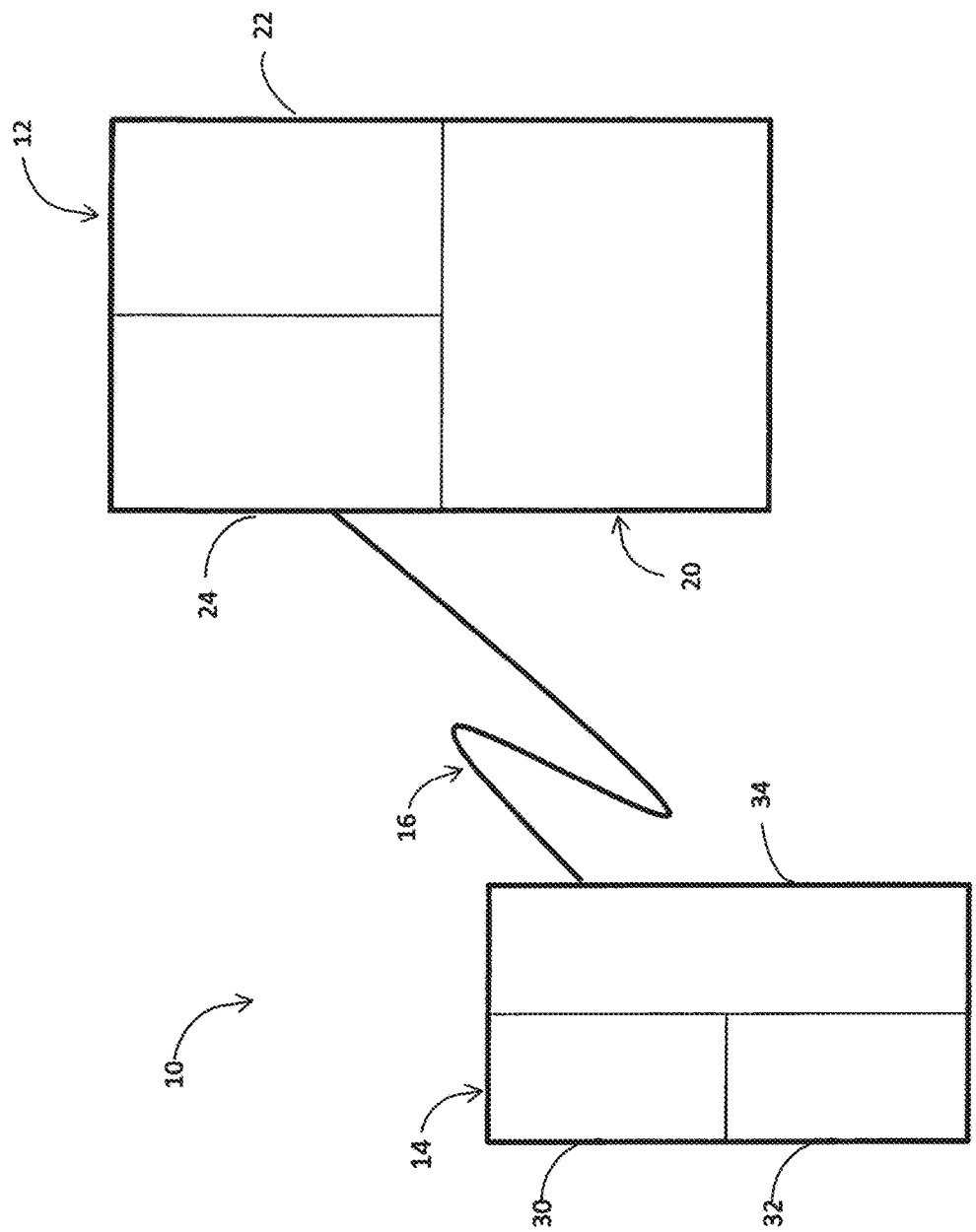
FIG. 2 illustrates a system for secure communications according to an embodiment of the disclosure.

FIG. 2 illustrates a system 10 according to another embodiment of the disclosure. As can be seen in FIG. 2, the system 10 includes an authenticating system 12, a device 14 and a communications network (com network) 16. The authenticating entity 12 is a component of a service system or device 20 to which the user desires secure communications. For example, the service system or device 20 may be, but is not limited to a financial institution, utility, automotive system, medical institution, government institution, cloud storage system, critical infrastructure system and military system or device.

The authentication system 12, which may be referred to as the authentication DUF device, includes computer components 22, which may include processor(s), memory, hardware, software, and firmware to execute instructions and store information for the secure communications. The authentication system 12 also includes a communications module 24 for communicating with the device 14 and with other components associated with the authentication system 12 and service system or device 20. For example, in a banking application, the authentication system 12 needs to communicate with other service systems, such as bank units, in order to process communication instructions received from and transmitted to the device 14. It is important to note that the device ID residing in the authentication system 12 should not be exposed or accessible by the authentication system administrator so as to limit access to the device ID.

The device 14 is used to securely communicate the identity of the device 14 so as permit data to be securely exchanged between the device 14 and the system 12. For example, the device 14 may be, but is not limited to a smart phone or other computer device. The computer device may be, but is not limited to smartphones, computer tablets, laptops, desktops, point of sale systems or devices and programming and test devices such as electronic control units (ECUs).

The secure communications network (network) 16 may be a wired network, wireless network, or combination thereof. The network 16 includes hardware, software, and firmware to execute instructions to securely transmit data via protocols, such as, but not limited to secure socket layer (SSL) and transport layer security (TLS). At least a portion of the network resides in the system 12 and device 14 as discussed below. The network may include external components (not shown), such as repeaters, boosters that are known components of network communications. As discussed above, after the registration of the device ID with the system, communications may be made in the clear as the data is protected by the dynamic ID. It should be understood, the system 12 may contain the device ID's of multiple devices.

The device 12 includes a user interface 20, a processor 22 and communications system 24. In this exemplary embodiment, the device 12 is a smart phone. The user interface 20 allows a user to enter data. In this exemplary embodiment, the user interface 20 is a touch screen. In other embodiments, the user interface 20 may be, but is not limited to touch screens, biometric readers, microphones, cameras and keypads.

The processor 22 may include one or more of hardware, software, firmware and memory capable of creating and storing the device ID, processing communications with the message/hash engine, and executing instructions at least in performing the secure communications. The processor may include an analog to digital converter. In an embodiment, the device ID is stored in a Tamper Resistant Device such as, but not limited to a SmartChip, Trusted Platform Module, or USB token, which may incorporated into the device 12 and/or processor 22 or may reside an another component.

The communications system 24 transmits communications over the communications network and includes a secure architecture such as, but not limited to secure socket layer (SSL) and transport layer security (TLS).

In another embodiment the, device 14 may be a combination of two or more devices and/or components. The two or more components may each perform specific functions or functions that overlap. In an embodiment, the device 14 may include an insertable/removable module that contains the stored device ID. The module may be, but is not limited to a smart card, trusted platform module (TPM), smart chip, memory chip, and USB device. For example, the module may be a TPM containing the device ID that is inserted into a laptop.

In an embodiment, the system 14 may be an unmanned vehicle (UV) and the device may be a command unit that securely communicates instructions to the UV through a communications link. In this embodiment, the UV is the authenticating entity that has stored in its memory a device ID created for the command unit. The UV may have one or more device IDs registered in its memory to allow operation by or hand-offs by one or more command units.

In various other embodiments, the system 14 may be a financial institution, a commercial retailer, a military system such as an unmanned vehicle control unit, an automobile electronics system, a medical institution, a critical infrastructure system such as a utility provider and security systems.

Various embodiments may be identified by the following examples, which are presented as examples and are not to be limiting of the disclosure.

1. For example, the system may be a financial institution and the authenticating system may be a financial transaction system and the device may be a smart phone or computer tablet.
2. For example, the system may be a retailer and the authenticating system may be the sales transaction system and the device may be a point of sales device, smart phone or computer tablet.
3. For example, the system may be an unmanned vehicle system and the authenticating system may be the operator control system and the device may be a unmanned vehicle control station.
4. For example, the system may be an automobile electronics system and the authenticating system may be the automobile computer control system and the device may be a computer system test device may be an electronic control unit for programing the automobile computer control system.
5. For example, the system may be a hospital drug dispensing system and the authenticating system may be a smart phone or computer tablet.
6. For example, the system may be a system in a control server in an electric grid energy control center and the device may be a keyboard used to send control commands.

The present disclosure is further directed to new hardware security solution for a UAV platform and corresponding protocols for ground station (GS) to UAV coupling, and active identity verification for command and control (C&C).

This protocol is implemented using tamper resistant hardware that will store an unreadable and thus irreproducible pattern (e.g., user's hand signature) that a user's identity is linked to. This unique signature will interact with dynamic input data producing hardware signature or hardware modified information.

The disclosed approach: (1) allows the GS to verify the authenticity of messages from the UAV, (2) allows the UAV to verify the authenticity of commands from the GS and (3) implement an exploit-resistant UAV/GS trusted identity scheme that is difficult to spoof or subvert. Such identities (verified through active authentication technique) would be useful in identifying registered and unregistered UAVs in both civil and defense applications, particularly in identity, friend or foe (IFF) applications.

There are two architectural components to creating enhanced identities for UAV platforms: (1) registration and (2) active authentication. Registration will be accomplished for both the GS and the UAV using physically binding process at a secure facility. This registration step uniquely pairs a GS with one or more UAVs. The active authentication will need to be a lightweight modification of existing C&C protocols. First, the UAVs and GS will each contain tamper-resistant, data-interactive hardware (form factor similar to a SmartCard) that will securely store GS-UAV pairing data and be capable of active identity/C&C verification. This identity and C&C verification technique may require time synchronization and a unique ID that can be used with the hashing algorithm. The unique ID and timestamp is combined with the tamper resistant hardware ID and is further obscured through a hash algorithm generating a hack resistant ID that is both dynamic and unique to GS-UAV pair. The data output from this physical device will be dynamic (near impervious to simulation and replay attacks). We call this authentication of each C&C message "Preconfigured Cognitive C&C (P3C)." Each hardware-signed C&C message will also be verified on the UAV platform by repeating the same process as outlined for the GS. In this way, the UAV will never respond to a command or a partial command (such as those that may be transmitted by a jammer) that is not authenticated.

EXAMPLE

An embodiment of a DUF application is presented in the following paragraphs and with reference to FIGS. 3-5.

We want the Bank A to issue a mobile phone that is near impossible/cost prohibitive to clone and used as a secure ATM device for Bob. Bank A wants to make sure that Bob's money is only accessible by Bob and only through Bob's mobile device using two factor authentication: what you know and what you have. The ideal PUF devices are difficult to make mostly because PUF behaviors are based on measuring nano-scale, matter-energy interactions nearing the sensitivities of quantum state measurements. The very attributes of measuring PUF properties are also the very same properties which give rise to unreliable, inconsistent measurements. Are there alternatives to PUF where we can avoid making nano-scale measurements while retaining the DUF-like abilities: data flows-in and interacts with medium where output data is modified/changed uniquely to that device?

A tamper evident device can be built where known data enters the black-box and gets modified in an unpredictable way but produces a pattern unique to the black-box. It is not the information but the behavior of the "black-box" which will be used to identify the device uniquely. We will refer to this "tamper evident black-box", a DUF.

Manufacturer of DUF:
1. DUF device may be a blackbox medium (ie., TMPs, SmartCard Chips) that will receive signals (i.e., EM wave, laser, electrical current) and the signal interacts with DUF medium with extremely difficult to predict DUF device dynamic signature. The complexity of output signal will need to have sufficient uniqueness that probability of having 2 different inputs producing the same output results is negligibly small. The complexity of unique signatures producible from DUF device must be magnitudes of orders bigger than the number of devices. All of these probabilities can be calculated and proved based on known hash algorithm used by DUF device.
2. Authenticating entity has library of escrowed DUF device IDs burned into a tamper resistant DUF processor.
3. Notice that DUF devices are essentially tamper resistant devices that will interact uniquely with dynamic inflow data, outputting DUF modified, and unpredictable outflow data unique to DUF device requesting authentication.

Figure 3:
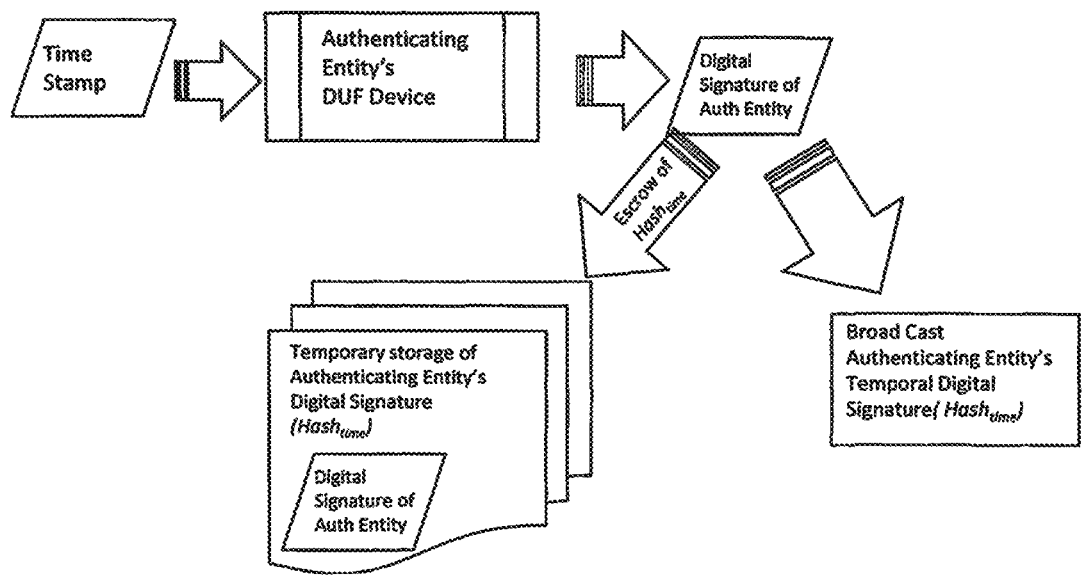
FIG. 3 illustrates a portion of a secure communications process at the receiver or authenticating entity according to an embodiment of the disclosure.
Figure 4:
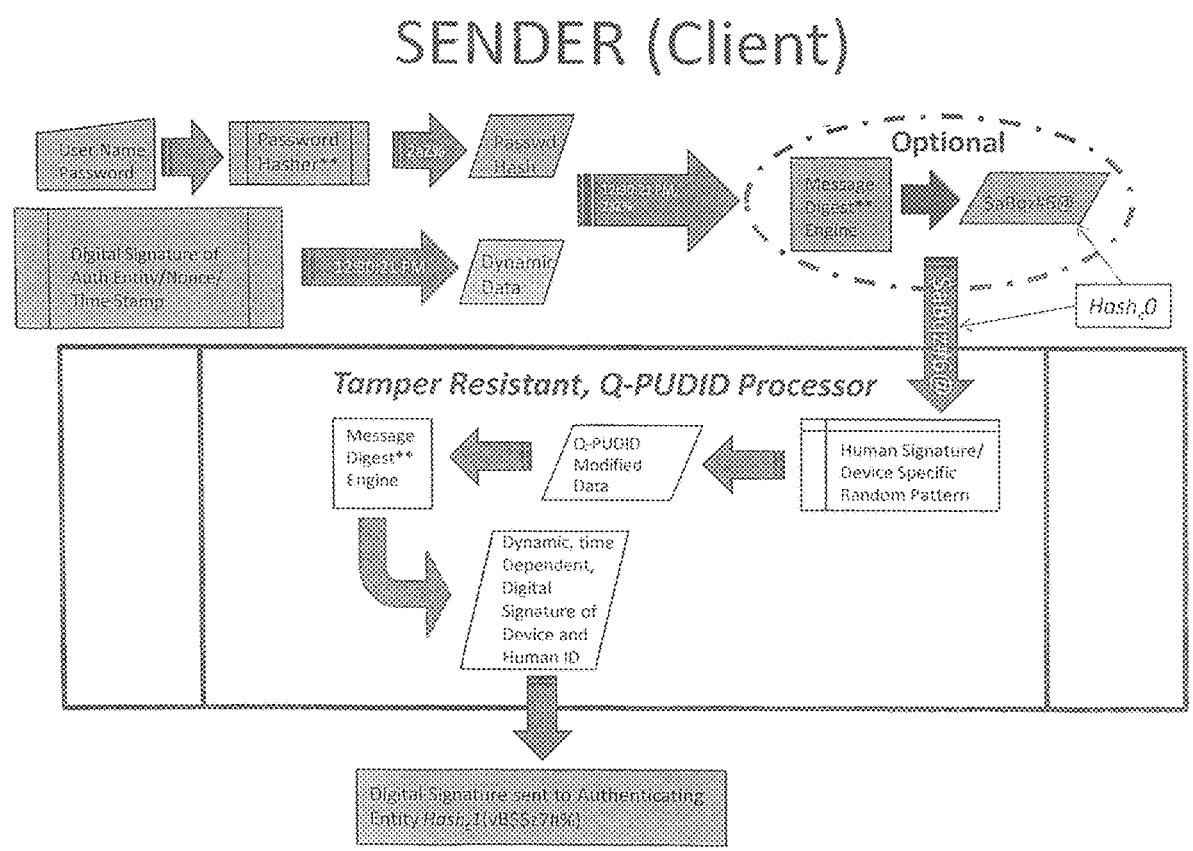
FIG. 4 illustrates a portion of a secure communications process at the sender or client according to an embodiment of the disclosure FIG. 5 a portion of a secure communications process at the receiver or authenticating entity according to another embodiment of the disclosure Wherever possible, the same reference numbers will be used throughout the drawings to represent the same parts.
Figure 6:
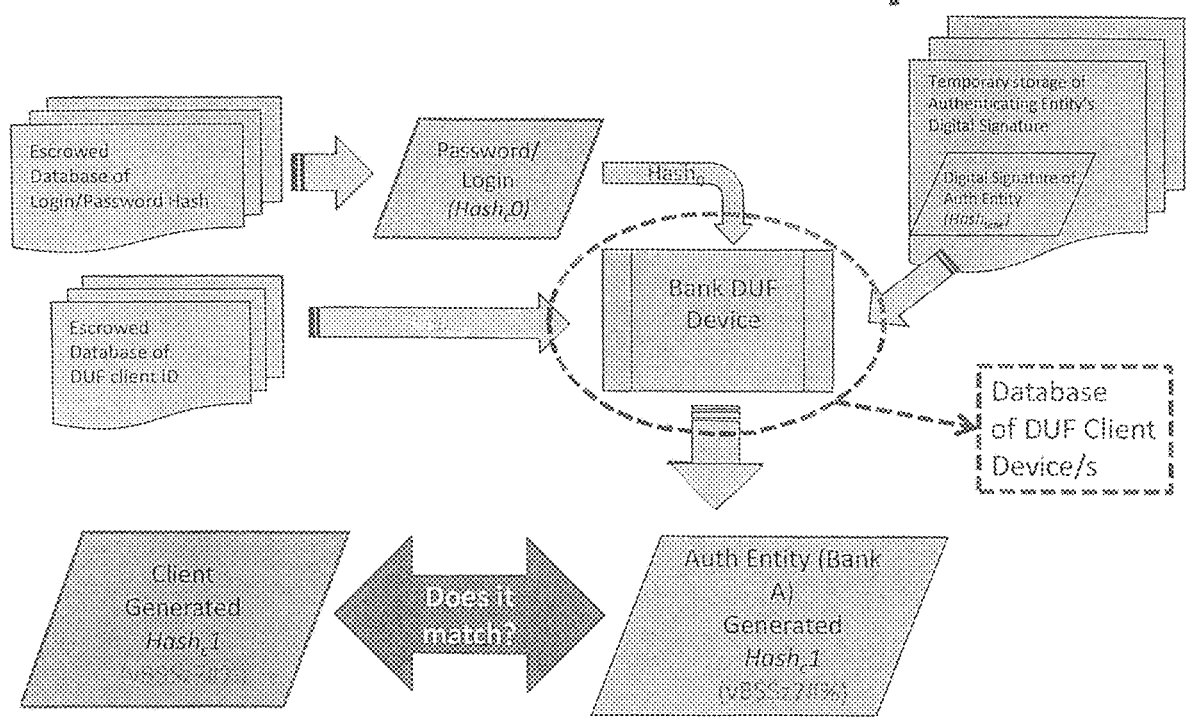

FIGS. 3-5 illustrate embodiments of the process as described and referred to in the remaining discussion presented in the Example below.

Uniquely Identify End-User and Phone using DUF

The DUF model can be used where we want Bank A to issue a mobile phone that can act as an ATM device for Bob. As illustrated by FIGS. 3-5, using a DUF to send information works in the following manner as discussed below:

Bank:
1) Bank A will assign a DUF device to be its own bank server device ID
2) The DUF system (Authenticating Entity) for the bank device can have additional "cloned" IDs or locked up in the safe for special purpose disaster recovery plan.
3) Bank A's server ID, timestamp, and device ID are passed through the DUF device
4) This input data is modified (XOR) unique to Bank A's DUF device (i.e., digitized data is operated on by the black-box to produce a DUF modified data)
5) DUF modified data is digitally signed using a hash function to produce time/transaction varying signature, ($Hash_{time}$).
6) This dynamic, time dependent, physical device ID signed data is sent to authenticating entity (DUF System) clients as ephemeral session ID ($Hash_{time}$).

Client:
7) Bob authenticates himself to the phone (e.g., using a login ID and password)
8) The phone hashes the login ID and password in volatile memory producing ($Hash_c0$)
9) Bob requests a connection to a Bank A server
10) Bank A's server sends the ephemeral session ID ($Hash_{time}$) to Bob's phone
7) The phone takes the derived ($Hash_c0$) value and Bank A sent ($Hash_{time}$) time stamps the data and runs it through Bob's DUF device. These data are put through client's phone and gets DUF modified, converted to digital data format and it is put through another hash function creating ($Hash_c1$).
8) ($Hash_c1$) is then sent to Bank A as Bob and Bob's unique phone ID.

Bank A:
1) One of Bank A's servers receives the sender's authentication request file
2) Bank A's server has a database of device IDs and Bob's hashed login ID and password, ($Hash_c0$), which is combined with the escrowed ephemeral session ID, ($Hash_{time}$), and the received timestamp, which is digitally marked using Bank A's escrowed DUF device producing hash1
4) The hash1 from Bob and the Bank A generated hash1 are compared; if the two hashed values are identical, the identity of Bob and his mobile phone are authenticated By carefully studying FIGS. 3, 4, and 5, one should notice that with DUF architecture, any potential attacker must physically steal the Bank's DUF device and each client's DUF device/phone and must be able to bypass the tamper resistant hardware in order to compromise the DUF System.

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosures of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:
1. A system, comprising:
a device comprising device memory;
an authenticating system comprising authentication system memory;
a device identification registered at both the device and the authenticating system; and
a communications network for transmitting data between the device and the authenticating system;
wherein the device and authentication system memories contain the device identification assigned to the device;

wherein the authenticating system authenticates the device for each transaction between the device and the authenticating system by comparing a dynamic login identification created for each transaction in both the device and the authenticating system; and wherein the dynamic login identification is created at the device and authenticating system by combining the device identification with a login and transaction information to create process data that is processed by a hash algorithm; and wherein the authentication system memory contains the device identification prior to authentication; and wherein the device identification is created from processing a user signature and a random number, the same device identification is used to create the dynamic login identification for each transaction.

2. The system of claim 1, wherein the device is selected from a group consisting of smart phones, computer laptops, computer tablets, point of sale devices and electronic control units.

3. The system of claim 1, wherein the device is an unmanned vehicle control unit and the authenticating system is an unmanned vehicle.

4. The system of claim 1, wherein the device memory resides on a platform selected from a group consisting of a trusted platform module, SmartCard, and SmartChip.

5. The system of claim 1, wherein the system is selected from a group consisting of financial institutions, commercial retailers, military systems, automobile electronics system, medical institutions, government institutions, cloud storage systems, critical infrastructure systems and security systems.

6. The system of claim 5, wherein the military system is an unmanned vehicle control system.

7. The system of claim 1, wherein the login is selected from a group consisting of a username, password and personal identification number.

8. The system of claim 1, wherein the transaction information is selected from a group consisting of time, transaction cost, command, request and location.

* * * * *